United States Patent
Lock et al.

(10) Patent No.: US 9,864,788 B2
(45) Date of Patent: Jan. 9, 2018

(54) METHOD AND SYSTEM FOR CASCADING A MIDDLEWARE TO A DATA ORCHESTRATION ENGINE

(75) Inventors: Hendrik C. R. Lock, Dettenheim (DE);
Vikas Lamba, Delhi (IN); Pravin Prakash Pattewar, Bangalore (IN);
Ramprasadh Kothandaraman, Bangalore (IN)

(73) Assignee: SAP SE, Walldorf (DE)

( * ) Notice: Subject to any disclaimer, the term of this patent is extended or adjusted under 35 U.S.C. 154(b) by 889 days.

(21) Appl. No.: 13/569,483

(22) Filed: Aug. 8, 2012

(65) Prior Publication Data

US 2012/0303580 A1  Nov. 29, 2012

Related U.S. Application Data

(62) Division of application No. 12/198,874, filed on Aug. 26, 2008, now Pat. No. 8,266,104.

(51) Int. Cl.
*G06F 17/30* (2006.01)
*G06F 9/54* (2006.01)

(52) U.S. Cl.
CPC .......... *G06F 17/30557* (2013.01); *G06F 9/54* (2013.01); *G06F 17/30011* (2013.01); *G06F 17/30569* (2013.01)

(58) Field of Classification Search
CPC .......... H04L 41/0659; G06F 17/30011; G06F 17/30516; G06F 17/30569; G06F 17/30864

USPC .................................................. 707/620, 621
See application file for complete search history.

(56) References Cited

U.S. PATENT DOCUMENTS

| | | | |
|---|---|---|---|
| 6,615,405 B1* | 9/2003 | Goldman et al. | 717/174 |
| 2005/0071839 A1 | 3/2005 | Kim et al. | |
| 2005/0283492 A1* | 12/2005 | Schmitt et al. | 707/100 |
| 2006/0190806 A1* | 8/2006 | Sasson et al. | 715/500 |
| 2007/0135137 A1* | 6/2007 | Olson | 455/456.1 |
| 2008/0075049 A1* | 3/2008 | Xie | 370/338 |
| 2008/0215743 A1* | 9/2008 | Wahl | 709/230 |

* cited by examiner

*Primary Examiner* — James Trujillo
*Assistant Examiner* — Fariborz Khoshnoodi
(74) *Attorney, Agent, or Firm* — Jones Day (57) ABSTRACT

Methods, systems, and computer-readable medium storing instructions thereon for implementing methods are directed to facilitating data exchange, such as accessing and operating on data objects, between field applications, such as mobile clients, and dedicated servers by leveraging the features of middleware. An embodiment includes a first server providing a first set of services and data to a mobile client. A first communicating middleware is connected between the first server and the mobile client according to a first communication functionality. A second server provides a second set of services and data according to a second communication functionality that is different from the first communication functionality. A second middleware communicates with the second server according to the second communication functionality, and communicates with the first middleware according to the first communication functionality. The second middleware is connected to the second server and the first middleware.

12 Claims, 6 Drawing Sheets

METHOD AND SYSTEM FOR CASCADING A MIDDLEWARE TO A DATA ORCHESTRATION ENGINE

CROSS-REFERENCE TO RELATED APPLICATIONS:

The present application is a Divisional Application from U.S. patent application Ser. No. 12/198,874. The contents of this application is incorporated herein by reference.

FIELD OF INVENTION

The present invention relates to systems, methods, and computer-readable medium storing instructions thereon for implementing methods for facilitating data exchange, e.g., accessing and operating on data objects, between field applications and/or dedicated servers.

BACKGROUND

Some businesses have a need for providing fast access to company information to employees in the field, e.g., sales professionals, purchasers, executives and the like. For example, a professional uses customer information and service information stored on a customer relationship management server which is also stored in a laptop to execute the services for the customers. The professional generates documents and inquiries that are sent to the customer relationship management server. However, at times, an existing or new field application requires additional objects from a third system, such as an enterprise resource planning (ERP) system. By using the dedicated middleware alone, it is not possible to support the required data exchange of additional data from the third system because the middleware is designed to work only between the dedicated server application and field application. The middleware cannot replicate data with a third system; meaning the following functional features, such as a capability to pull data from another system, capability to determine deltas, or changes, capability to the pulled data, capability to perform a key mapping between the involved systems, and capability to handle data with specific formatting, such as documents formatted for transferring the data for a business transaction including data change pointers originating from the third system, are missing.

Field or mobile applications, such as a mobile subscriber application, exchange data with dedicated server applications using dedicated middleware. The mobile service application may be a mobile function hosted on a laptop-based application, for example, used by a service technician working in the field and providing services to customers. The field, or mobile, application acts as a channel to exchange data with an application server, such as a customer relationship management (CRM) application. Functionalities in the mobile application extend some functionalities provided in the application server to a user of the field or mobile application. To exchange data between the mobile application server and the mobile application, middleware functionalities may be used.

At present, available methods do not appear to support the required the data exchange with additional data from the enterprise resource planning (ERP) system using CRM middleware alone. In available methods, the CRM middleware is designed to work only between the CRM server application and other applications. Technically, it is understood that the CRM middleware cannot replicate with a third system. For example, such functional features as a pull mechanism, key mapping service, delta compare service to compare deltas on pulled data and intermediate document handling may not be available via such a system.

It is generally not feasible to replace the mobile application middleware (used by the mobile client) fully because of the existing functionalities and landscape dependencies of mobile clients on the present mobile application middleware. Accordingly, a need exists to develop a solution that provides the functions which overcome the above and other limitations of the described mobile application computing environment.

DETAILED DESCRIPTION

Embodiments of the present invention provide systems, methods, and computer-readable mediums storing instructions thereon for implementing methods to enable a data exchange between a third system, e.g., a backend system, and a mobile application.

Embodiments of the present invention provide access to data by a system including a first server, a first middleware, a mobile client, a second server and second middleware. The first server provides a first set of services and data to a mobile client. In an embodiment, the mobile client is configured to exchange data with the first server. The first middleware is connected between the first server and the mobile client and communicates between the first server and the mobile client according to a first communication functionality. In an embodiment, the second server provides a second set of services and data according to a second communication functionality that is different from the first communication functionality. The second middleware is connected to the second server and the first middleware. The second middleware provides the mobile client access to the services and data provided by the second server by communicating with the second server according to the second communication functionality and communicating with the first middleware according to the first communication functionality.

Embodiments of the present invention include a computer-implemented method for providing access to data. In a first step, a first set of services and data to a mobile client are provided by a first server, the mobile client configured to exchange data with the first server. The first middleware connected between the first server and the mobile client communicates according to a first communication functionality. A second set of services and data are provided by a second server according to a second communication functionality that is different from the first communication functionality. A second middleware communicates with the second server according to the second communication functionality and communicates with the first middleware according to the first communication functionality. The second middleware is connected to the second server and the first middleware.

Embodiments of the present invention provide a computer-readable medium embodied with instructions for providing access to data stored in an incompatible application, the instructions causing a computer to execute the various computer-implemented method embodiments of the present invention.

Figure 1:
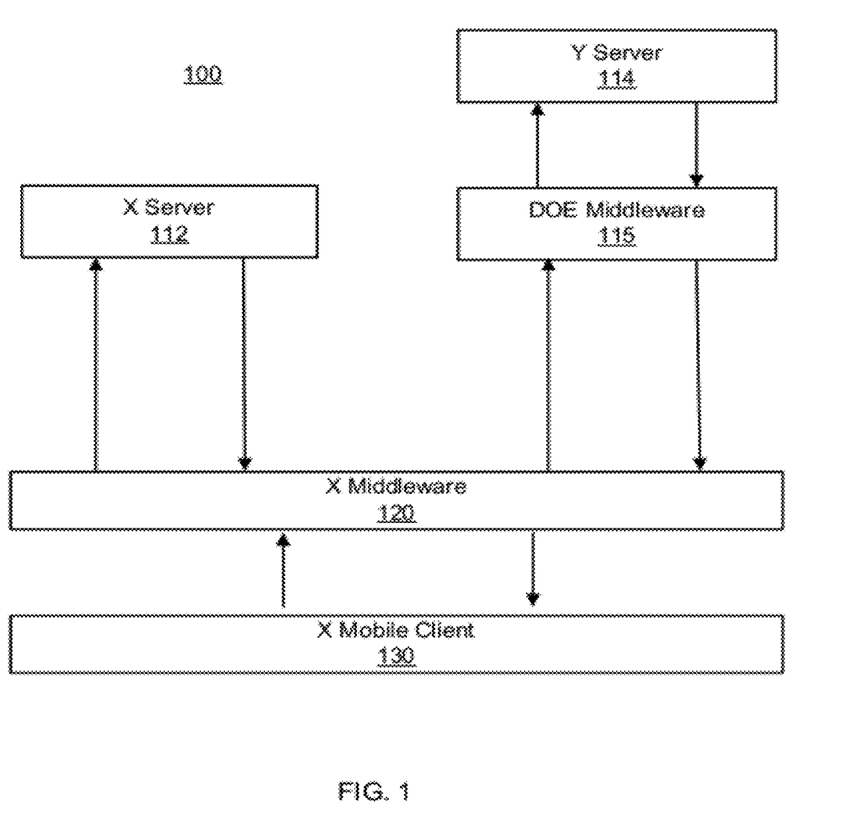
FIG. 1 illustrates an exemplary data flow according to an embodiment of the present invention.

FIG. 1 illustrates the exemplary data flow for an embodiment of the present invention. The software modular system 100 includes an X Server 112, a Y server 114, a data orchestration engine (DOE) middleware 115, an X middleware 120, and an X mobile client 130. The X application in the X server 112 can be any server-based application, such as a Customer Relationship Management application provided by SAP. In an embodiment, the server/client combination of the X server 112 and the X mobile client 130 are configured to operate together. In an embodiment, the data exchange between the X server 120 and the X mobile client 130 is facilitated by X middleware 120 using adapters and/or mobile bridges. The X middleware 120 enables the X mobile client 130 to pull and push data from and to the X server 112, and vice versa. In an embodiment, although designed for flexibility, the X middleware 120 does not facilitate data exchange with all types of server-based applications, for example, Y server 114. The Y application in Y server 114 can be any type of application, for example, an enterprise resources planning application, such as those provided by SAP. The DOE middleware 115 forwards mobile business objects from the X mobile client 130 to the Y server 114 and can be a back-end server.

In an embodiment, the exchange of data between the backend Y server 114 is brought to DOE 115 system by at least one of: a server-driven approach and a middleware driven approach.

In an embodiment of a server-driven approach, data is sent from backend server 114 to the DOE 115 as an intermediate document or in another form. The data can be received by the DOE 115. The data is interpreted and saved in the DOE 115. In an embodiment of a server-driven approach, a change to the data triggers an event in response to which a connected device pulls data indicated in the event. An intermediate document received via a push mechanism is processed by the DOE middleware 115 using a pull replication, the entire document is read, and data changes are consolidated with a version of the document stored in the DOE middleware 115 CDS. The DOE middleware 115 then pushes the data to the CRM middleware 120.

In an embodiment of a middleware driven approach, due to a lack of server-driven data, data can be pulled from backend server 114 with the help of remote function call (RFC) modules and saved into DOE 115. The RFC calls are discussed in further detail, e.g., with reference to FIG. 2. In an embodiment of a middleware-driven approach, change events are not triggered. Instead, the middleware performs periodic pulls on the data objects since it cannot receive events. However, CRM middleware 120 cannot perform either function. In an embodiment, the DOE converts the backend communication protocol or functionality into one that is understood by the CRM middleware (MW) 120.

In an embodiment, the data is sent from the DOE 115 to X server MW 120 via an RFC module. The X server MW 120 can use replication and realignment services to send data to X Server Mobile Client 130. The X Server Mobile Client 130 uses data exchange services to send data to X Server MW 120. Another RFC module requests data to be sent from the X middleware 120 to DOE 115. In an embodiment, the data is sent from DOE 115 to Y Backend Server 114 via another RFC.

Embodiments of the present invention provide a system involving any or all forms of data including, e.g., intermediate documents transferring data for a business transaction, and services for various computer applications.

In an embodiment, the data flow is accomplished by the processing of remote function calls (RFC) or remote process calls (RPC). The DOE also provides the functionality of push-pull that is not available to the X middleware 120. Specifically, the DOE middleware 115 provides the capability to receive an intermediate document with the primary key and document type, and in response to receiving the intermediate document to pull the data from the backend Y server 114. In an embodiment, the X server 112 may not provide this data. In an embodiment, the push of the Y server 114 data and/or services cannot be handled by the X server 112. In some embodiments discussed here, there are two types of business objects: server-driven and middleware-driven. The former example embodiment is a server-driven approach. In a middleware-driven approach, change events are not triggered. Instead, in an embodiment, the middleware performs periodic pulls on the data objects since it cannot receive events. DOE middleware 115 converts the backend communication protocol or functionality into one that is understood by the CRM middleware 120.

Figure 2:
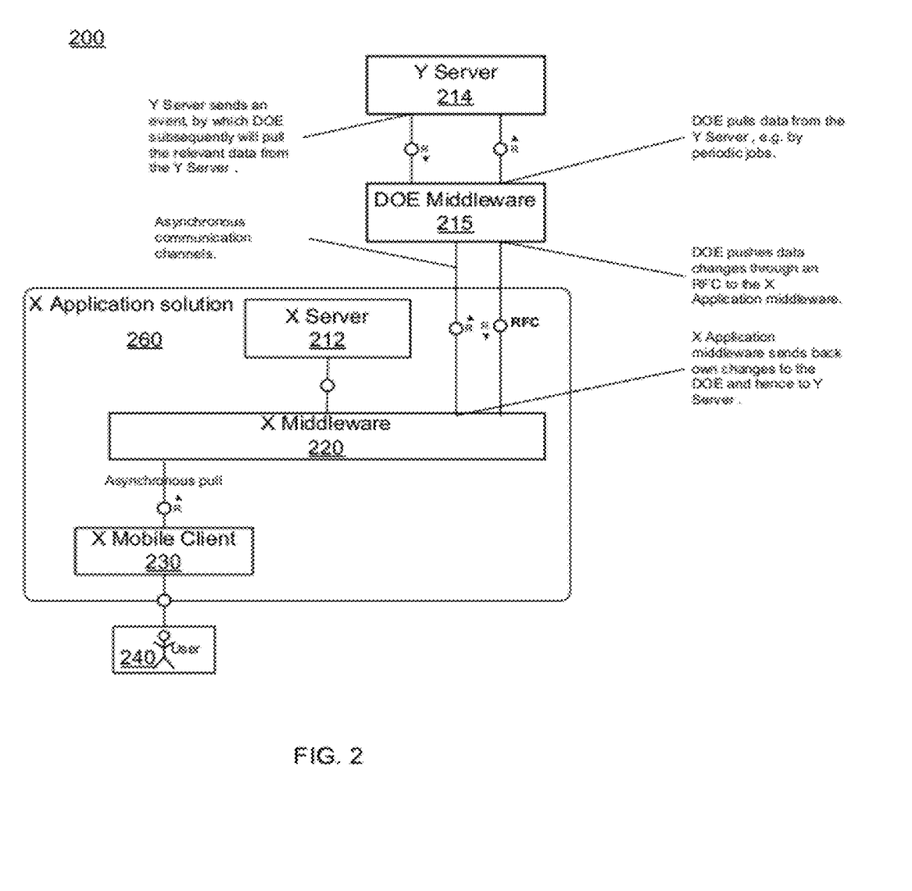
FIG. 2 illustrates an exemplary request flow according to an embodiment of the present invention.

FIG. 2 illustrates an exemplary request function call flow diagram according to an embodiment of the present invention. The exemplary system 200 includes an X application solution 260, a data orchestration engine 215, and a Y server 214. The X application solution 260 includes an X server 212, an X middleware 220 module, and an X mobile client 230. The X mobile client 230 provides another user interface via the mobile client to the X application solution 260 for the user 240. In an embodiment, a response to requests from the X mobile client 230, X middleware 220 provides data to and from the X server 212 to the X mobile client 230.

In an embodiment, the DOE middleware 215 facilitates communication between the Y server 214 and the X Application solution 260 via asynchronous communication channels with the X middleware 220. In an embodiment, in response to remote function calls (RFC) from the X middleware 220, the DOE middleware 215 interprets the remote function calls. In response, in an embodiment, the DOE middleware 215 determines data changes by the backend Y server 214. This function can be performed by the DOE middleware 215 either periodically pulling data or by receiving a change event. For example, in the periodic pull, the DOE middleware 215 pulls data periodically from the Y server 214 and compares each pulled data object with its version in its own data base in order to determine a change. For example, in the case of a change event, the DOE middleware 215 receives a change event (through an intermediate document) from the Y server 214, the event triggers the pull operation as described above. For example, in the pull operation, the DOE middleware 215 pushes all changed data to the X middleware 220 (via an RFC call). In response to the push from the DOE middleware 215, the X middleware 220 pushes each changed data which belongs to the Y server 114 back to the DOE middleware 215 via an RFC call. The DOE middleware 215 then consolidates the changes in its own database, and, if no conflict exists, sends this change to the Y server 114. In an embodiment, a conflict occurs if the Y server 214 has changed the same data object concurrently. In the case of a conflict, the changed data sent by X middleware 220 is discarded, and instead the changed data of Y server 114 is kept, and a conflict message sent to X middleware 220.

The X middleware 220 pushes changes in data originating from Y server 214, which can be changes (revision or deletion) in data originated from Y server 214 and creation of new data relevant to be saved in Y server 214. In an embodiment, in case of creation of new data made by the mobile client 230, there is no need of any comparison by DOE middleware 215 with its own database and can directly be pushed to Y server 214. In an embodiment, the DOE middleware 215 compares the changed data or a representation thereof, such as primary key information, to data or primary key information stored in the local data store, i.e., the CDS. If there are no data conflicts within the CDS, the change data is stored. The changed data is then pushed by the DOE middleware 215 to the Y server 214. Specific embodiments are described with reference to FIGS. 3 to 5.

Figure 3:
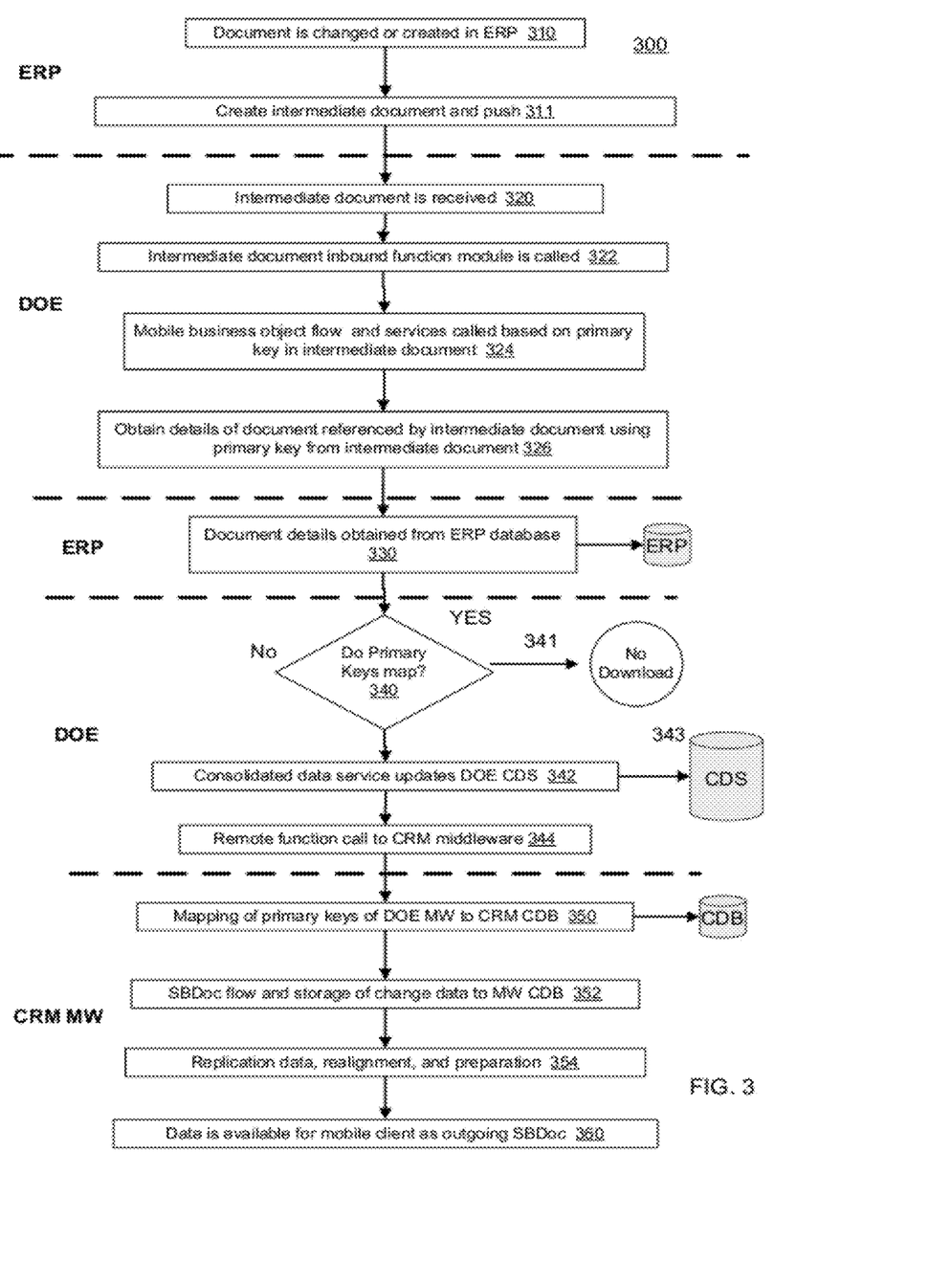
FIG. 3 illustrates an exemplary document download from a server to a mobile client according to an embodiment of the present invention.

FIG. 3 illustrates an exemplary document download from a server to a middleware according to an embodiment of the present invention.

The documents to be downloaded can be located in the Y server 114 of FIG. 1, in which case the Y application can be an enterprise resource planning application (ERP). The document download process 300 begins with a document being changed in, for example, an ERP application (Step 310). For example, a change to a document can include a deletion of the document, a creation of a document, or a revision to an existing document. In an embodiment, when the document is changed, an intermediate document containing data such as a primary key that can be used to identify the document, is also created. An intermediate document can be an event message that is locally passed from the Y server 114 to the (DOE) middleware 115. In an embodiment, the intermediate document is created for the document and passed to the receiver systems periodically in step 311. The following steps can occur in the data orchestration engine (DOE) middleware 115 of, e.g., FIG. 1. In an embodiment, the intermediate document is forwarded to the DOE from the ERP in step 320 with reference key information. In an embodiment, the primary key information includes at least one of the document identifier, the document type and any combination of data associated with the intermediate document. At step 322, the intermediate document inbound function module is called based on the intermediate document message type. In an embodiment, the intermediate document Inbound function module performs based on the intermediate document type and document type, the intermediate document Inbound function module identifies associated MBO which needs to be used for further operations. After the intermediate document inbound function module performs its functions, a mobile business object (MBO) flow and services are called in step 324 using the primary key of the business object. At 326, a routine is called using the primary key passed from the Y server 114. For example, in the Y server 114, the details are fetched from a database accessible by Y server 114 (Step 330) for the primary key. This data is forwarded in step 340 to a key mapping service. If, for example, the data has not changed for the primary keys, the intermediate document is not downloaded at this time (Step 341). However, for example, if there are new primary keys, new data or data existing in the consolidated data store (CDS) has changed, the consolidated data store service is called at step 342. The CDS service includes logic for comparing primary keys to determine if changes have occurred as well as logic to resolve any data conflicts. In the exemplary embodiment, the backend Y server 114, or ERP server, is the Master system, so, for example, all data conflicts are resolved in favor of the backend Y server 114.

In an embodiment, the CDS is updated with the new data or changed data at step 343. In an embodiment, in response to the CDS Service call, a Custom Service is called at Step 344, and an RFC call to the X middleware 120, in this case, a customer relationship management (CRM) middleware, is made. The particular data is sent to the CRM middleware per the remote function call. In an embodiment, at step 350, a mobile bridge function module for DOE middleware to CRM middleware mapping is called. For example, the mobile bridge function module maps data provided by the DOE through or via the custom service to the mobile client via a channel provided by the CRM middleware. For example, the mobile bridge forwards a call to a routine called SBDoc Flow at 352. The SBDoc contains data in the form (or structure) of root segment and child segments. The SBDoc flow routine saves/updates SBDoc data to CDB tables in CDB database. The same SBDoc is forwarded for processing such as replication and realignment, and placed in the outbound flow for the mobile client 130 at step 354. In an embodiment, the Y server document data is available at step 360 for the mobile client 130 as an outgoing synchronized business document (SBDoc). The SBDoc may have data in the form or structure of a root segment and child segments. In an embodiment, the SBDoc flow saves and updates SBDoc data to the consolidated database. In an embodiment, the SBDoc is forwarded for processing such as a replication and realignment, and placed in the outbound flow.

Figure 4:
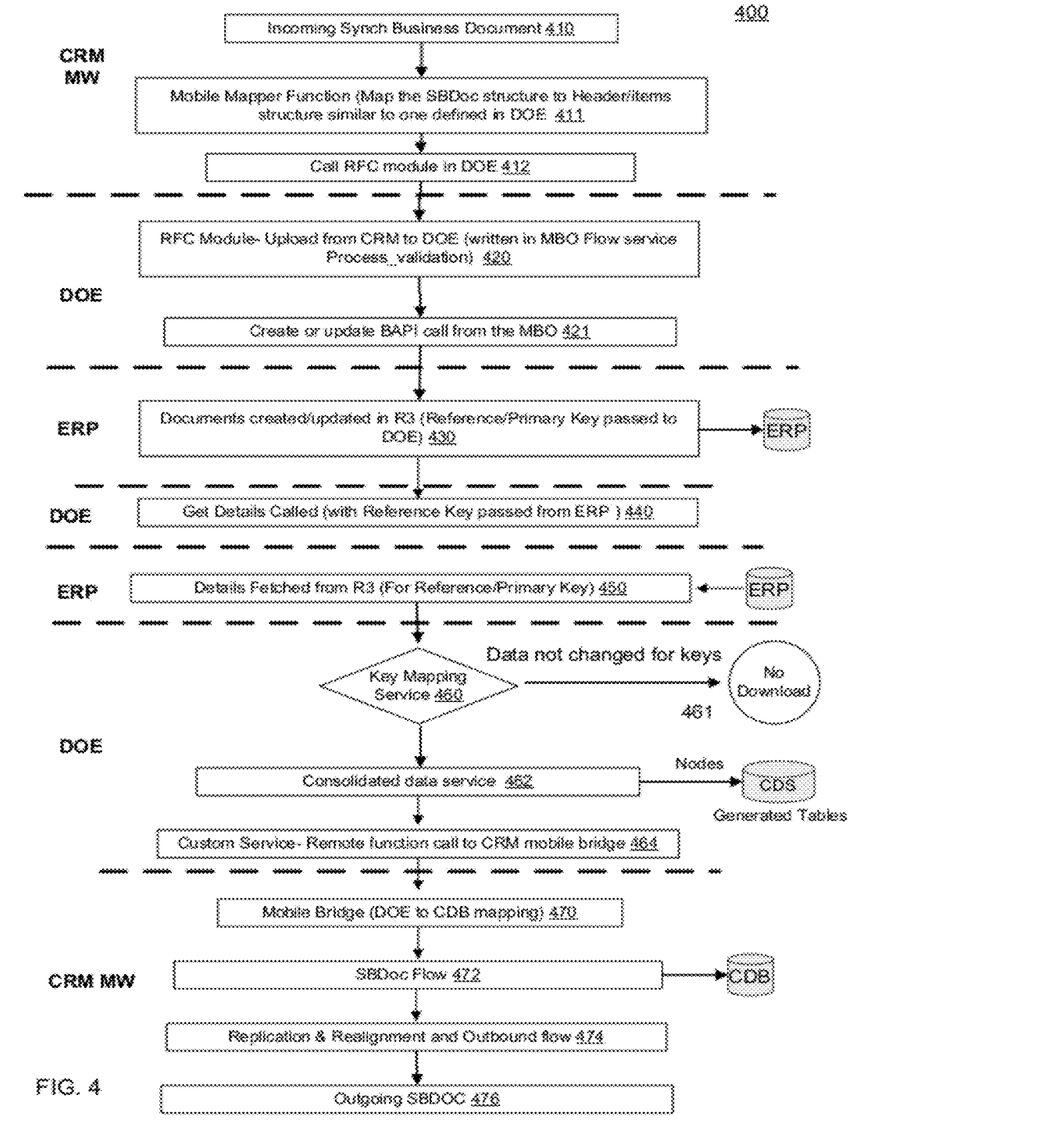
FIG. 4 illustrates an exemplary document upload according to an embodiment of the present invention.

FIG. 4 illustrates an exemplary document upload according to an embodiment of the present invention. The document upload process 400 begins with an incoming Sync Business document (SBDoc) being received at the X mobile client 130, or the X middleware 120 in step 410. A mobile mapper function at step 411 performs a mapping of the SBDoc structure to a header/items structure similar to one defined in the DOE middleware. At step 412, a call is made for the RFC module in the DOE middleware. In an embodiment, in the DOE middleware, the RFC module acts to upload data from the CRM (X) middleware to the DOE middleware (Step 420). The RFC module is written in the mobile business object (MBO) flow service called Process_Validation service. The Process_Validation service functions to place the data received from CRM middleware (X middleware) in the DOE main data stream. In an embodiment, an instance of the business application programming interface (BAPI) is created for the MBO (step 421) in the DOE middleware. A BAPI is a function module (in ERP in this scenario). There can exist multiple BAPIs for an MBO (in DOE) to perform various operations like create, update, or delete, and the like. Depending on the data received from CRM middleware (X middleware), the corresponding create/update BAPI is called in step 421. In an embodiment, from the backend server, i.e., the ERP, the document's reference, or primary, key created and/or updated in the ERP application, such as R3, are passed to the DOE in step 430.

In an embodiment, at step 440, the DOE middleware after receiving the reference key, instantiates a Get Details service that will use the reference key to perform its task. In the ERP at step 450, the details are fetched from the ERP application and the ERP database. The fetched details are returned to the DOE to perform key mapping. A key mapping service performs key mapping at step 460. In an embodiment, the key mapping service at step 460 determines if there has been any changes, or deltas, to the data in the Sync Business document (SBDoc). If data has not changed for the keys, there is no download flow 461. In an embodiment, in the DOE middleware, if new keys are provided, or if it is determined that data has changed, i.e., there is a data delta, a consolidated data store (CDS) service is called (Step 462) to save data contained in the MBO to CDS database. At step 464, a custom service is called to provide a RFC to the CRM mobile bridge in the CRM middleware.

In the CRM middleware, the mobile bridge performs a mapping of the data from the DOE to the client database (CDB) at step 470. At 472, the data in the SBDoc is flowed to the middleware, and root and child segments of the SBDoc date are stored in data structures within the client database according to the mapping. In an embodiment, upon replication and realignment with the mobile client, an outbound flow routine is called and the requested documents are prepared for delivery to the client (Step 474). In step 476, the outgoing SBDoc is sent to the mobile client as requested.

In the example document upload of FIG. 4, the interaction of steps 440 to 476 provide similar examples as steps 326-360 of FIG. 3.

Figure 5:
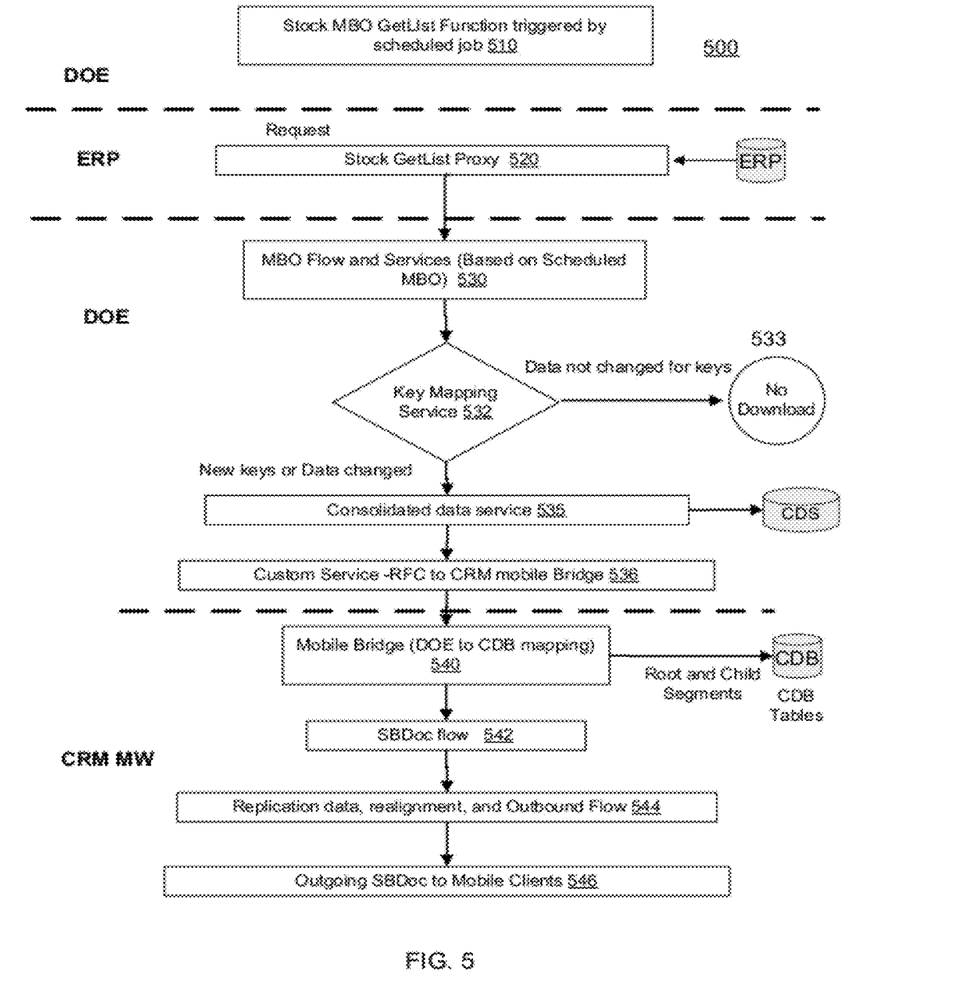
FIG. 5 illustrates an exemplary stock download according to an embodiment of the present invention.

FIG. 5 illustrates an exemplary stock download according to an embodiment of the present invention. This is an example of a middleware driven approach to the communication problem. The stock download process 500 provides the mobile client with a status of the available stock or other commodity available to the user of the mobile client.

In an embodiment, in the DOE middleware, in response to a scheduled job to pull data from the ERP database, a Stock mobile business object GetList function is triggered (Step 510). This function makes a request to the backend ERP server. In the ERP at step 520, the stock GetList Proxy function retrieves the requested information, which can be all of the information regarding stock in inventory or the like, from the ERP database. In an embodiment, a response is forwarded from the ERP backend to the DOE middleware. Based on the scheduled mobile business object, a mobile business object flow and services are called by the DOE (Step 530) and the required services and flow are performed on the data provided from the ERP database. The fetched details are returned and used when performing key mapping. A key mapping service performs key mapping at step 532.

In an embodiment, the key mapping service determines if there has been any changes, or deltas, to the data in the mobile business object (MBO). For example, when data (e.g., document) is stored in the ERP database, it is given a unique identifier or primary key, e.g., reference key. The primary key or reference key can include a document number, a document type or some other data that can be used to uniquely identify the document. Similarly, the DOE also assigns keys to the data that is stored in the consolidated data store (CDS).

In an embodiment, the key mapping service at step 532 compares the keys provided by the ERP to the DOE to keys for data stored in the CDS. If data has not changed for the keys, there is no download flow 533. In an embodiment, in the DOE middleware, if new key are provided or it is determined that data has changed, i.e., there is a data delta, a consolidated data store (CDS) service is called (Step 535) to generate object nodes for the MBO and tables are generated within the consolidated data store indicating or representing the changed data. In an embodiment, at step 536, a custom service is called to provide a RFC to the CRM mobile bridge in the CRM middleware. In an embodiment, the particular data is sent to the CRM middleware per the remote function call, or remote process call.

In the CRM middleware, the mobile bridge is a function that performs a mapping of the particular data from the DOE to the client database (CDB) of the CRM middleware at step 540. At 542, the SBDoc is flowed via a CRM middleware data flow from the CRM middleware, data stored in data structures within the client database (CDB) according to the mapping. Upon replication and realignment with the mobile client, an outbound flow routine is called and the requested documents are prepared for delivery to the client (Step 544). In step 546, the outgoing SBDoc is sent to the mobile client as requested.

Figure 6:
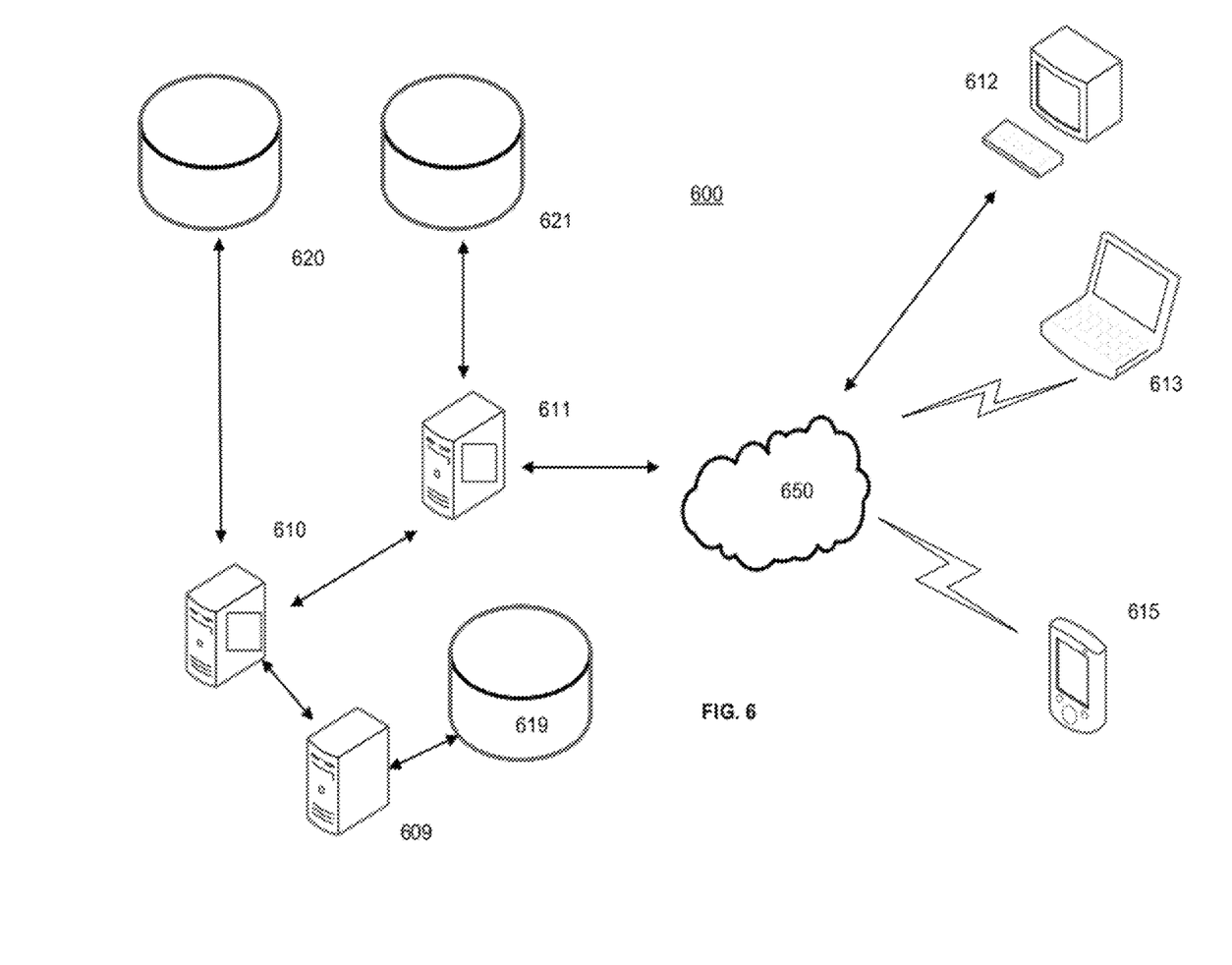
FIG. 6 illustrates an exemplary system for implementing the disclosed methods according to an embodiment of the present invention.

FIG. 6 shows an exemplary system for implementing the disclosed methods according to an embodiment of the present invention. The exemplary system 600 includes a first server 610, a second server 611, network 650, client terminals 612, client laptops 613, client handhelds 615 and data repositories 620 and 621.

In an embodiment, each of servers 609, 610 and 611 includes a processor and can host a plurality of software modules accessible by client terminals 612, client laptops 613, or client handhelds 615 through the network 650. In an embodiment, each of the client terminals 612, client laptops 613, or client handhelds 615 can have installed software modules for implementing a plurality of different data processing and other types of computer applications that use data overlapping from one of the different data processing or computer applications to another of the data processing or computer applications.

In an embodiment, each of servers 609, 610 and 611 provide access to disparate applications within the system 600. In an embodiment, Server 609 is a backend server including an ERP application connected to data storage 619, while server 610 includes the DOE middleware and server 611 includes the X application, or CRM application, and X middleware, or CRM middleware. In an embodiment, data storage 621 includes the CRM application database. In an embodiment, data storage 620 connected to server 610 includes the DOE consolidated data storage. The above described system is exemplary, and modifications to network are possible for implementing the claimed method.

In an embodiment, each of devices 612, 613 and 615 includes a processor and a display device, and are capable of receiving inputs from a graphical user interface. In an embodiment, devices 612, 613 and 615 are used to generate data and documents usable in methods of the present invention.

For example, network 650 is the Internet, an intranet, a public network, a private network, a local area network (LAN), a wide area network (WAN), a wireless network, or any network suitable for implementing the exemplary embodiments.

In an embodiment, the software module(s) including program instructions are stored on computer readable media such as discs, including CD and DVD, flash memory, hard drives including magnetic and optical drives, or any other suitable computer readable media, and that will cause a computer or processor to execute the program instructions. The software language used to write the software modules can be any that is suitable for implementing the described exemplary embodiments, and such languages are known to those of skill in the art.

Embodiments of the present invention provide systems and methods that include beneficial functionalities like a pull mechanism, key mapping service, delta compare service and intermediate document handling provided in a DOE can be utilized directly with disparate applications. For example, capabilities of DOE like parallelization, error handling, monitoring and mass data handling can also be used effectively without a need to change the full system landscape as the existing middleware functionality is still available.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A computer-implemented method for providing access to data and maintaining data integrity, the method comprising:
    changing data by either adding or revising data in a document in a first server using a first computer application;
    assigning keys to documents containing the changed data at a first middleware associated with the first computer application in a key mapping operation, wherein the documents containing the changed data include new documents that are assigned new keys and revised documents, which have previously assigned keys;
    calling, by the first middleware, a service operating on a second middleware, wherein the service call includes new keys and keys of documents with new data, and wherein push and pull functionality of data in the first server is not available directly to the second middleware;
    after the new keys match the previously assigned keys maintained by the first middleware, replicating the changed data in the document and update data, maintained by the first middleware, related to the document;
    mapping the changed data and a primary key related to the changed data provided by the first middleware to a database maintained by a second server;
    replicating the changed data at the second middleware; and
    uploading the replicated data to a client.

2. The computer-implemented method of claim 1, wherein the second middleware responds to remote function calls and remote process calls.

3. The computer-implemented method of claim 1, wherein the new keys are stored in a consolidated data store.

4. A computer-implemented method for providing access to data and maintaining data integrity, the method comprising:
    triggering a scheduled data retrieval operation at a first middleware to retrieve data maintained by a first server;
    retrieving data from a database maintained by the first server;
    analyzing the retrieved data at the first middleware;
    assigning keys to documents generated by the data operations at the first middleware in a key mapping operation, wherein the documents generated include new documents that are assigned new keys and revised documents which have previously assigned keys;
    calling, by the first middleware, a service operating on a second middleware, wherein the service call includes new keys and keys of documents with new data, and wherein push and pull functionalities of data in the first server is not available directly to the second middleware;
    at the second middleware, comparing the keys included in the service call to keys maintained at the second middleware;
    after the comparison of the keys indicates new data or revised data, data is stored in a database maintained by a second server;
    replicating the data stored in the database maintained by the second server at the second middleware; and
    forwarding the replicated data to a client.

5. The computer-implemented method of claim 4, wherein the second middleware responds to remote function calls and remote process calls.

6. The computer-implemented method of claim 4, wherein the new keys are stored in a consolidated data store.

7. The computer-implemented method of claim 1, wherein the second middleware communicates with the first middleware according to a first communication functionality and the second middleware communicates with the second server according to a second communication functionality.

8. The computer-implemented method of claim 1, further comprising receiving at the first middleware a second set of data changes from the second middleware, wherein the second set of data changes were pulled by the second middleware from the second server.

9. The computer-implemented method of claim 8, wherein the second set of data changes are not available directly to the first middleware.

10. The computer-implemented method of claim 4, wherein the second middleware communicates with the first middleware according to a first communication functionality and the second middleware communicates with the second server according to a second communication functionality.

11. The computer-implemented method of claim 4, further comprising receiving at the first middleware a second set of data changes from the second middleware, wherein the second set of data changes were pulled by the second middleware from the second server.

12. The computer-implemented method of claim 11, wherein the second set of data changes are not available directly to the first middleware.

* * * * *